3,410,911
MONOETHYLTETRABORANE
Morton J. Klein and Richard G. Maguire, Chicago, Ill., assignors, by mesne assignments, to Mine Safety Appliances Company, a corporation of Pennsylvania
No Drawing. Filed July 16, 1956, Ser. No. 598,977
1 Claim. (Cl. 260—606.5)

This invention relates to a method of preparing boron-containing high energy fuels and more particularly to the preparation of alkyl substituted higher boranes by the reaction of a higher borane and an alkene in the presence of an aluminum chloride catalyst.

A high energy fuel must contain a large proportion of hydrogen and the remaining elements in its composition must be of as low an atomic weight as possible. These attributes are found in many compounds containing boron and particularly in the boranes. The unmodified boranes each have, however, one or more objectionable physical properties: diborane is a gas at ordinary temperatures and pressures, pentaborane is a stable liquid but has a low spontaneous ignition temperature and decaborane is a solid. In contrast, the alkyl derivatives of higher boranes are liquids having properties almost ideally suited for use as high energy fuels. The term "higher boranes" is used herein to refer to volatile reactive boranes having from 4 to 12 boron atmos per molecule, such as $B_4H_{10}$, $B_5H_9$, $B_5H_{11}$, $B_6H_{10}$, $B_8H_{12}$, $B_{10}H_{14}$, and $B_{12}H_{12}$. The solid unreactive, nonvolatile, higher boron hydrides are referred to as $(BH)_x$ polymers. In the copending application of Schechter and Klicker, Ser. No. 546,819, filed Nov. 14, 1955, of common ownership with this application, it is disclosed that alkyl substituted higher boranes can be prepared by reacting a lower alkene hydrocarbon with a volatile higher borane at superatmospheric pressures.

An object of this invention is to provide an improved method of preparing alkyl substituted higher boranes by the reaction of an unsaturated alkene hydrocarbon and a higher borane in the presence of an aluminum halide catalyst.

Other objects of this invention will become apparent throughout the specification and claims as hereinafter related.

This invention is based upon the discovery that the reaction of an alkene and a higher borane may be carried out at more moderate conditions of pressure and temperature than was heretofore believed possible when the reactants are contacted with an aluminum trihalide catalyst.

In one experiment pentaborane-11 ($B_5H_{11}$) was reacted with ethylene in a series of three U-traps connected into a high vacuum system protected from the atmosphere. Approximately one gram of aluminum chloride was distilled into the system and condensed in the central trap. The entire surface of the central trap was kept cold so that the entire surface was coated with aluminum chloride. Then 141.3 cc. (gas at STP; throughout the speification, the amount of reactants and products are given by the volume the material would occupy at STP) of $B_5H_{11}$ and 696 cc. of $C_2H_4$ were distilled into the left end trap, which was cooled by a liquid nitrogen bath. The liquid nitrogen bath was removed from the left end trap and the right end trap was immersed in a —160° C. bath. Thus, as the left end trap was warmed the gases distilled over the catalyst in the central trap to the right end trap. When the distillation was complete the —160° C. bath was removed from the right end trap and the left end trap was immersed in a —160° C. bath so that the gases would distill back over the catalyst. Eight passes were made over the catalyst in this manner. During the whole reaction time the reactor, or central trap, was kept at room temperature. The reaction system was at subatmospheric pressure throughout the reaction period. There was no hydrogen formed in the reaction, showing that there was no thermal decomposition of the pentaborane-11. There was distilled from the liquid reaction products 606 cc. of unreacted ethylene and 56.1 cc. of unreacted pentaborane-11. Thus, essentially a 1 to 1 reaction of ethylene to pentaborane-11 had occurred since 90 cc. of ethylene and 85.2 cc. of pentaborane-11 were consumed. The remaining less volatile products were then carefully fractionated under vacuum. About 90 percent of the product distilled through a —23° C. bath, but not through a —46° C. bath. This fraction was a tensiometrically homogeneous material which exerted a vapor pressure of 5 millimeters at 0° C. and 18 to 19 millimeters at 23° C. The molecular weight of the material was determined by its vapor density to be 94.5; the theoretical value for monoethylpentaborane-11 ($C_2H_5B_5H_{10}$) is 93.6. Each liter of monoethylpentaborane-11 should theoretically contain 0.223 mat. (milligram-atom) of boron; the product contained 0.218 mat. of boron per liter. When the product was hydrolyzed with a dioxane-water mixture over 95 percent of the theoretical amount of hydrogen was evolved. For each 12 mols of hydrogen evolved one mol of ethylene was obtained as would be expected. Infrared spectrum analysis showed that the product was a derivative of pentaborane-11, proving no molecular rearrangement or pyrolysis of the borane occurred during the course of the alkylation. The small fraction that was less volatile than the major product fraction consisted of more highly alkylated pentaborane-11 derivatives.

Tetraborane and ethylene were reacted in the same manner as in the above experiments. Tetraborane (766 cc.) and ethylene (582 cc.) were passed over an aluminum chloride catalyst five times. There was essentially no reaction. Then an additional 1190 cc. of ethylene was added to the reaction mixture, which made a total of 1774 cc. of ethylene, and 7 passes were made over the catalyst. About 4 percent of the ethylene had reacted. The reaction mixture was separated by vacuum distillation and a nonvolatile product was isolated. The product was shown by infrared spectrum analysis to be a derivative of $B_4H_{10}$. The molecular weight of the material was 98.4 which is intermediate to the molecular weight of monoethyltetraborane (81.3) and diethyltetraborane (109.3).

In another experiment in which tetraborane and ethylene were reacted in similar manner; the reactor, coated with aluminum chloride, was maintained at a temperature of 80° C. The charged amount of tetraborane was 766 cc. and of ethylene was 3006 cc. The reactants were passed through the catalyst reactor seven times. The reaction mixture was carefully fractionated and 697 cc. of tetraborane were recovered, showing that 69 cc. had reacted. The major product fraction was purified by fractional condensation through a —63.5° C. trap. The product material was tensiometrically homogeneous, exerting a vapor pressure of 14 millimeters at 0° C. The molecular weight of this material was 79.2 compared to the calculated value of 81.3 for monoethyltetraborane ($C_2H_5B_4H_9$). A 15.3 cc. sample of this material was hydrolyzed, oxidized with hydrogen peroxide and titrated for boric acid. The boron content of the material was determined to be 95.0 percent of that expected for monoethyltetraborane. The infrared spectrum for this material showed that it was a derivative of tetraborane. The total quantity of monoethyltetraborane produced was 24.2 cc., representing a 35 percent yield based on the tetraborane consumed.

The aluminum trihalide catalyst, exemplified by $AlCl_3$, promotes the reaction of lower alkene hydrocarbons with other boron hydrides such as $B_5H_9$ and $B_{10}H_{14}$ and mixtures of higher boranes obtained from the pyrolysis of be performed at atmospheric or subatmospheric pressures, and it also accelerates the reaction when carried out at higher pressures. The use of the catalyst is particularly suited, however, for preparation of tetraborane and pentaborane-11 derivatives. Tetraborane and pentaborane-11 are somewhat unstable and are easily pyrolyzed to other boranes; this pyrolysis reaction of course occurs simultaneously with the ethylene-borane reaction. When the alkylation reaction can be carried out at moderate conditions of pressure and temperature, such as are possible with the use of the aluminum trihalide catalyst, the amount of tetraborane and pentaborane-11 consumed by the pyrolysis reaction is minimized. To this end the temperature should not exceed 100° C.

The reaction is accelerated when excess ethylene is used. It is preferred to use at least 2 mols of ethylene for each mol of borane, and even when as much as 5 mols of ethylene is used for each mol of borane the alkylborane products are predominantly mono- and dialkyl derivatives.

The liquid alkyl substituted boranes which are produced by the above reactions are useful as high energy fuels in bipropellant systems. These liquid high energy fuels burn readily with conventional oxiders, including air and oxygen, and are primarily useful in turbojets, ramjets, and rocket engines. These fuels may be used alone or in mixture with other fuels toward which they are chemically inert, e.g., most ordinary hydrocarbon fuels. These fuels have a high heat of combustion, are spontaneously flammable in air at high temperatures, and have other desirable fuel properties, such as large liquidus range, low viscosity, stability against thermal decomposition and resistance to hydrolysis.
diborane. The use of the catalyst permits the reaction to In actual tests a sample of the fuel is introduced into the combustion section of a jet test engine, burned with compressed air, and the efficiency of the combustion and output of the engine measured. When the alkyl substituted borane fuel was burned in a test engine it was found to have a heat of combustion more than 20 percent greater than the best hydrocarbon fuels, the combustion efficiency was equal to JP-4 (a standard jet fuel in use for several years past), and the thrust of the engine per unit weight of fuel was substantially greater than the thrust obtained using the best hydrocarbon fuel. In comparative tests on the fuel produced by the above process and other boron containing high energy fuels and other hydrocarbon fuels, it has been found that the engine output is directly proportional to the heat of combustion per unit weight of fuel. Thus an aircraft using a high energy boron-containing fuel can travel proportionally further with the same load, or it can carry a proportionally greater load than when filled with conventional fuels.

According to the provisions of the patent statutes, we have explained the principle of our invention and have described what we now consider to represent its best embodiment. However, we desire to have it understood that, within the scope of the appended claim, the invention may be practiced otherwise than as specifically described.

We claim:
1. Monoethyltetraborane.

References Cited

Hurd: American Chem. Soc. Journal, vol. 70 (1948).
Stock: "Hydrides of Boron and Silicon," Cornell Univ. Press, Ithaca, N.Y. (1933), page 57.

TOBIAS E. LEVOW, *Primary Examiner.*

W. F. W. BELLAMY, *Assistant Examiner.*